United States Patent
Moran et al.

[15] 3,683,102
[45] Aug. 8, 1972

[54] CLOSING PLATE FOR ELECTRIC METER HOUSING

[72] Inventors: Jack Moran, Muskogee; Boyd Steveson, Fort Gibson; William A. Reynolds, Oklahoma City, all of Okla.

[73] Assignee: M-R-S, Inc., Fort Gibson, Okla.

[22] Filed: Feb. 11, 1970

[21] Appl. No.: 10,439

[52] U.S. Cl. ............ 174/50, 317/105, 324/110, 324/156
[51] Int. Cl. ........................................... H05k 5/03
[58] Field of Search...... 317/104, 105, 106, 107, 109, 317/108, 110, 111; 324/156, 110; 174/50

[56] References Cited

UNITED STATES PATENTS

| | | | |
|---|---|---|---|
| D220,187 | 3/1971 | Moran et al. | D26/1 |
| 2,154,411 | 4/1939 | Road et al. | 317/107 |
| 2,165,483 | 7/1939 | Huggins | 317/104 X |
| 2,875,409 | 2/1959 | Lamb et al. | 324/156 X |
| 3,397,346 | 8/1968 | Sloop | 317/104 |

Primary Examiner—Lewis H. Myers
Assistant Examiner—D. A. Tone
Attorney—Beveridge and De Grandi

[57] ABSTRACT

A closing plate for an electric meter housing has a transparent central portion which prevents unauthorized access into a meter housing, and a pair of rearwardly-extending cylindrical skirt portions which are located and dimensioned to engage with surfaces existant in different types of meter housings.

5 Claims, 7 Drawing Figures

PATENTED AUG 8 1972 3,683,102

INVENTORS
JACK MORAN
BOYD STEVESON
WILLIAM A. REYNOLDS

BY Beveridge & De Grandi

ATTORNEYS

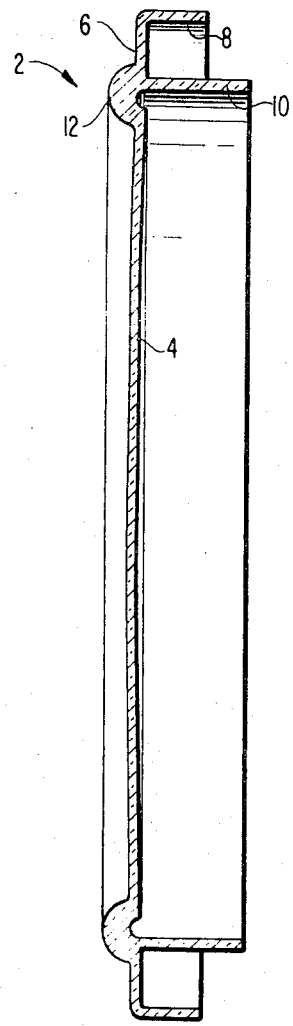
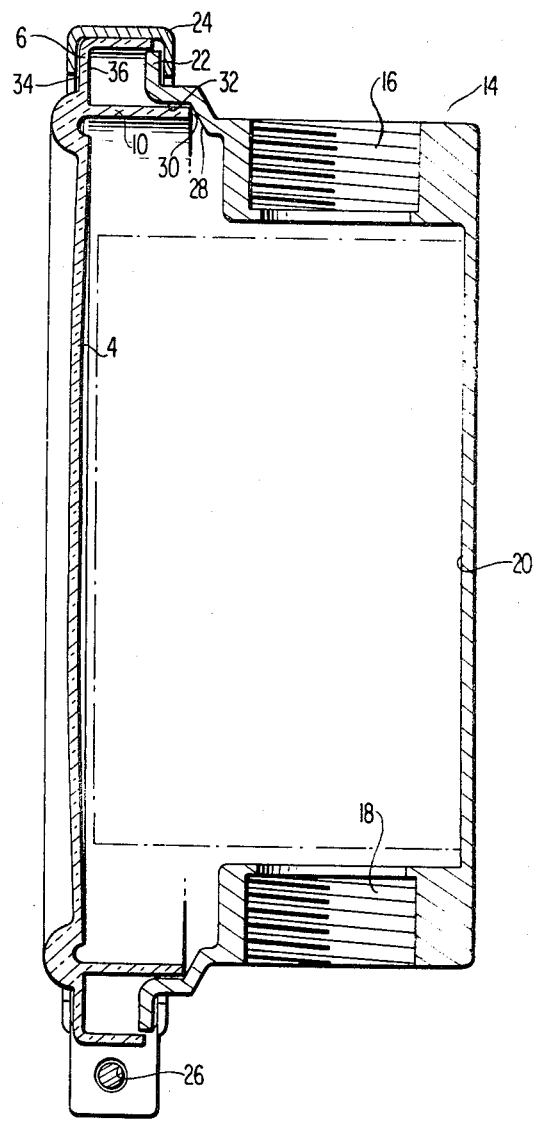
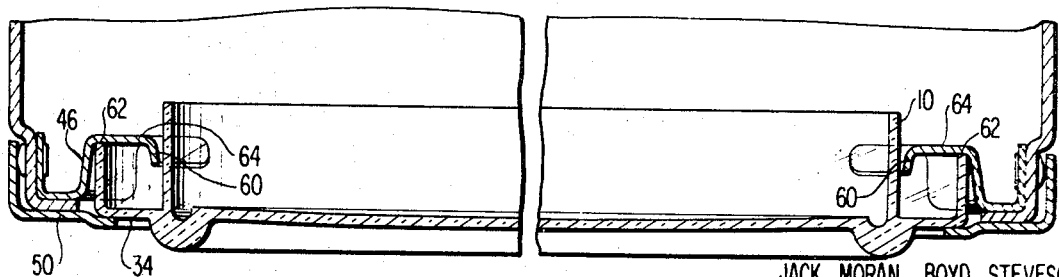

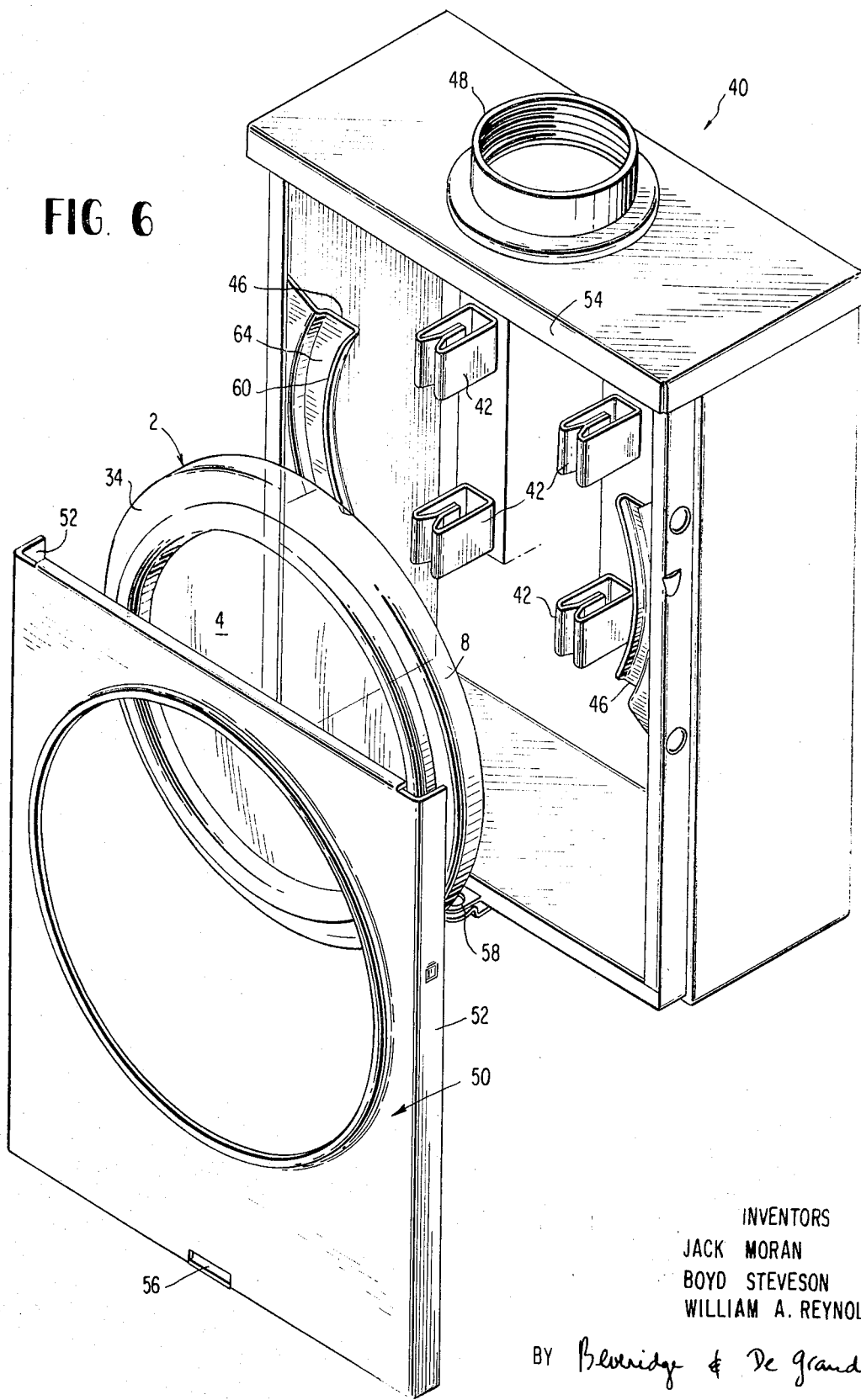

CLOSING PLATE FOR ELECTRIC METER HOUSING

This invention relates to a closing plate for an electrical meter housing. It is well known that closing plates are used by electric utility companies to obstruct the opening in a meter housing whenever a meter is removed from its socket in the housing. The presence of the closing plate prevents individuals from receiving electrical shocks from the meter socket terminals and it also prevents unauthorized persons from completing the circuit through the meter socket in order to obtain unmetered electric power.

In the past, it has been common to provide a specially designed closing plate for each type of meter housing and socket arrangement. Although there have been so-called "universal" closing plates which may be used with different types of housings, these have compromised their dimensions so that they do not properly and securely rest in place in any of the meter housings.

It is an object of this invention to provide a closing plate which engages existing structure in meter socket housings in a novel manner; and, furthermore, this invention involves a closing plate which is capable of accurate and secure engagement with different types of electric meter socket housings.

According to one aspect of the invention, there is a planar body which has a continuous circular central portion for preventing access into a meter housing and a peripheral flange portion which is generally coplanar with a central portion. A pair of concentric cylindrical skirts extend rearwardly from the planar body, with the innermost cylindrical skirt extending rearwardly from the juncture of the central portion and the flange portion.

According to another concept of the invention, a closing plate has a cylindrical skirt with an outside diameter from 5⅞ to 6 inches so that its inner edge will project inwardly and rest on the shoulder of one type of meter socket housing. A central portion closes the openings through the cylindrical skirt, and a flange extends radially outwardly from the cylindrical skirt where the inner face of the flange lies at least three-eighths inch from the inner edge of the cylindrical skirt. The particular dimensions described permit the closing plate to be inserted within and rest on the shoulder of a standard circular meter housing.

The invention may also be described as a closing plate which has a central portion and a radiating flange portion, wherein there are means providing at least two radially spaced-apart abutment surfaces. One of these abutment surfaces lies approximately one-half inch from a face of the flange at a radial distance of from 3⅜ inches to 3½ inches from the central axis of the device. The other abutment surface is spaced a greater axial distance from the same face of the flange, and it is located a radial distance of from 2⅞ to 3 inches from the central axis of the device.

An understanding of the construction and utility of the closing plate of this invention may be assisted by referring to the accompanying drawings which show one suitable embodiment wherein FIG. 1 is a perspective view of a closing plate constructed according to the invention.

FIG. 3 is a cross sectional view taken in a plane extending through the central axis of the closing plate.

FIG. 5 is a sectional view of the apparatus of FIG. 4 when in assembled relationship.

FIG. 6 is an exploded view of the invention in the environment of another type of housing.

FIG. 7 is a sectional view through the apparatus of FIG. 6 when assembled.

Figure 1:
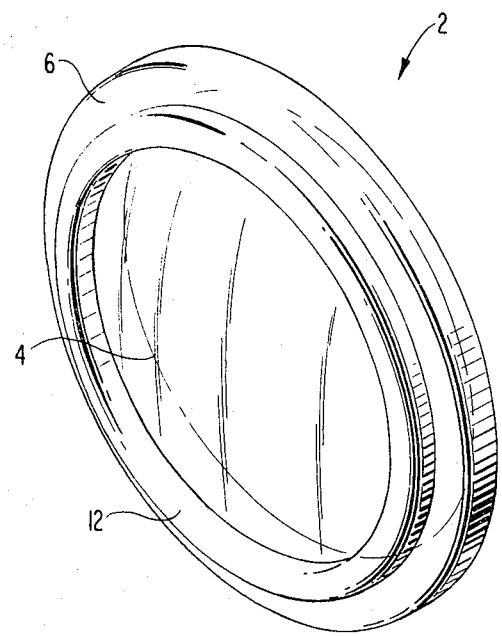
Figure 2:
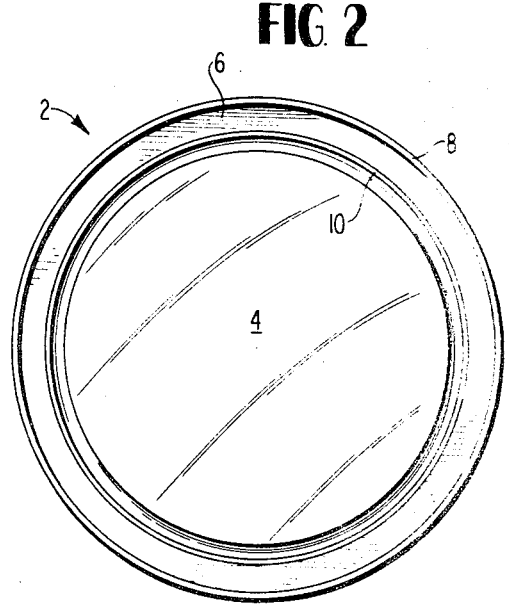
FIG. 2 is a rear view of the closing plate.

As shown in FIGS. 1–3, the closing plate is a unitary body of transparent plastic material such as the polycarbonate resin sold by the General Electric Company under the trademark LEXAN. Polycarbonates are special types of polyesters in which groups of dihydric phenols are linked through carbonate linkages.

The closing plate 2 includes a central circular portion 4 which serves as a barrier preventing access into the meter socket. A radially extending flange 6 is preferably coplanar with the central portion. At the periphery of the flange 6, there is a rearwardly-extending outer cylindrical skirt portion 8; and, at the juncture of the central portion 4 with the flange 6, there is a rearwardly-extending inner cylindrical skirt 10. A circular projection 12 extends outwardly from the front of the closing plate 2.

Figure 4:
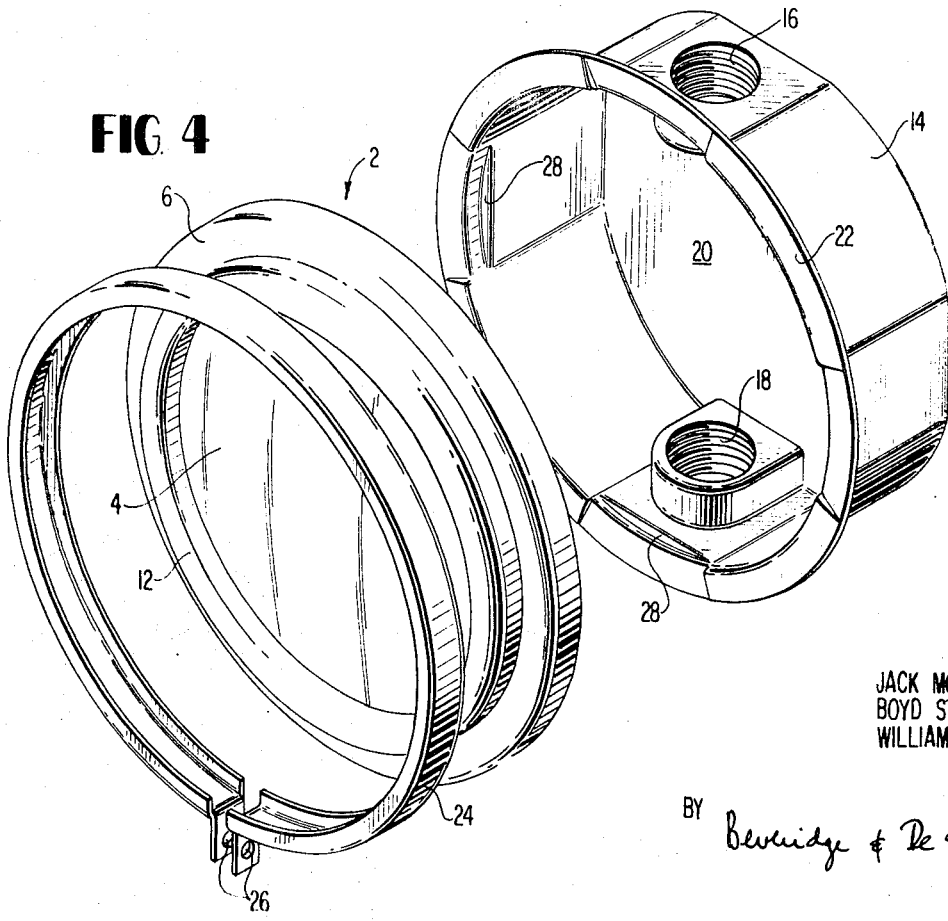
FIG. 4 is an exploded view of the closing plate according to the invention in conjunction with one type of standard meter socket housing.

The functions of the various portions of this apparatus will vary with the nature of the meter socket housing associated therewith. One type of housing, termed a circular housing for reference purposes, is shown in FIG. 4. It includes a circular or polygonal sidewall 14 provided with threaded openings 16 and 18 for receiving electrical conduits. The housing also includes a base 20 and a front flange 22 which extends radially outwardly from the housing. A contractible rim member 24 is circular and has a U-shaped transverse cross section. This rim 24 is circumferentially contracted by a threaded fastener which passes through the openings 26 to hold either a standard electrical meter or the closing plate disclosed herein to the flange 22.

Located within the housing shown in FIG. 4, there are four equally-spaced shoulders 28 which abut the closing plate. In FIG. 5, it will be seen that the inner edge 30 of the cylindrical skirt 10 seats on the shoulders 28 to position the central portion 4 and the flange portion 6 properly with respect to the housing. The contractible rim 24 is then located so that its parallel legs enclose both the flange portion 6 and the flange 22 of the housing.

The dimensions of the closing plate will, of course, play an important part in enabling it to cooperate with a housing of the type shown in FIGS. 4 and 5. The cylindrical skirt 10 should have an outside diameter of from 5⅞ to 6 inches so that it will enter the housing and properly seat within the arcuate surface designated 32 in FIG. 5. Furthermore, this outside diameter will result in an abutment between the inner edge 30 of the closing plate and the shoulders 28 of the housing. It is also desirable that the axial distance from the edge 30 to the outer face 34 of the flange 6 be approximately ¾ inch so that the closing plate will properly cooperate with the contractible rim portion 24. The axial distance between the inner face 36 of flange 6 and the inner edge 30 of the cylindrical skirt 10 should be at least 3/8 inch so that the edge 30 will contact the shoulder 28 in the meter housing. The outside diameter of the peripheral surface established by the outer skirt 8 is approximately seven inches in order to provide proper cooperation between it, the flange 22 on the housing and the contractible rim 24 which holds the closing plate in position.

The adaptability of the inventive closing plate to another type of meter housing will be appreciated by inspecting FIGS. 6 and 7. The meter housing 40 is a rectangular box which encloses the meter socket elements 42 and a pair of arcuate meter-supporting brackets 46. A fitting 48 in the upper wall of the housing accommodates a suitable electrical conduit.

The front wall 50 of the housing 40 is removable and has side flanges 52 which extend around the side walls of the housing. The uppermost portion of the removable front wall 50 slips beneath a forward flange 54 on the housing, and the lower portion of the front wall 50 has a slot 56 which receives an apertured tongue 58 on the housing. When the housing is assembled, the front wall 50 is held in place by the flange 54 on the main housing and by a locking element which passes through the aperture in the tongue 58.

The closing plate shown in FIGS. 6 and 7 is identical to the one previously described. The manner in which it operates with the housing of FIG. 6 is shown in FIG. 7. The inner cylindrical skirt 10, although not essential in this environment, lies within the area bordered by the innermost arcuate flanges 60 to assist in properly aligning the closing plate and preventing it from falling during placement of the front wall 50 on the housing.

The outer cylindrical skirt has its innermost edge 62 forming an abutment surface which lies against the radially outermost portion of the base 64 of the brackets 46. This positions the closing plate axially and, like the skirt 10, maintains it in concentric relationship to the arcuate seating surfaces in the brackets 46. The important dimensions in this situation are the axial distance between the inner edge 62 of the outer skirt 8 and the outer face 34 of the flange portion 6, which should be approximately one-half inch; the outside diameter of the skirt 8 is approximately 7 inches so that it will lie in the position shown in FIG. 7; and, the outside diameter of the inner skirt 10 should not exceed 6 inches.

The peripheral face portion of the flange 6 is abutted by the face plate 50, as will be seen from FIG. 7. Therefore, when the face plate is locked in position, the closing plate 2 will be properly held in place to prevent tampering with the meter socket and permit a visual inspection of the interior of the meter housing.

From the foregoing description, it will be appreciated that we have invented a closing plate which is simple yet is suited to utilization with quite different types of electric meter housings. While we have shown a preferred embodiment of the invention, it is expected that those working in this art will be capable of developing closing plates which are different in appearance but similar in principle to the closing plate disclosed herein. Therefore, we do not wish to be limited solely to the disclosed embodiment, but intend that the scope of our invention be as defined in the following claims.

We claim:

1. In combination, an electric meter housing having an opening for receiving an electric meter, an electric meter socket within the housing, and a closing plate for closing the opening to prevent access to the electric meter socket, said closing plate comprising a planar body having a continuous circular central portion and a peripheral flange portion which is generally coplanar with the central portion, a first cylindrical skirt portion extending rearwardly from the juncture of the central portion and the flange portion, and a second cylindrical skirt portion spaced from and concentric with the first cylindrical skirt portion and extending rearwardly from the flange portion.

2. A closing plate according to claim 1 wherein the central portion is transparent.

3. A closing plate according to claim 1 wherein the outside diameter of the first cylindrical skirt portion is from 5⅞ to 6 inches.

4. A closing plate according to claim 3 wherein the outside diameter of the second cylindrical skirt is approximately 7 inches.

5. A closing plate according to claim 3 wherein the axial distance from the inner edge of the first cylindrical skirt to the outer surface of the peripheral flange portion is from five-eighths to seven-eighths inch.

* * * * *